United States Patent
Sayeedi

(10) Patent No.: US 8,279,765 B2
(45) Date of Patent: Oct. 2, 2012

(54) METHOD AND APPARATUS FOR INTERWORKING IN AN INTER-TECHNOLOGY NETWORK

(75) Inventor: Shahab M. Sayeedi, Naperville, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1050 days.

(21) Appl. No.: 11/860,086

(22) Filed: Sep. 24, 2007

(65) Prior Publication Data

US 2008/0112434 A1    May 15, 2008

Related U.S. Application Data

(60) Provisional application No. 60/865,538, filed on Nov. 13, 2006.

(51) Int. Cl.
*H04W 4/00* (2009.01)

(52) U.S. Cl. ........ 370/252; 370/331; 370/335; 370/352; 370/401

(58) Field of Classification Search ............... None
See application file for complete search history.

(56) References Cited

U.S. PATENT DOCUMENTS

| | | |
|---|---|---|
| 6,173,182 B1 | 1/2001 | Cha |
| 6,741,862 B2 | 5/2004 | Chung et al. |
| 7,113,799 B2 | 9/2006 | Ahmad et al. |
| 7,733,816 B2 * | 6/2010 | Hwang ................ 370/310 |
| 2002/0067707 A1 | 6/2002 | Morales et al. |
| 2002/0145990 A1 | 10/2002 | Sayeedi |
| 2003/0129980 A1 | 7/2003 | Sayeedi |
| 2003/0171117 A1 | 9/2003 | Wang et al. |
| 2003/0223383 A1 | 12/2003 | Chang et al. |
| 2003/0223393 A1 | 12/2003 | Lee |
| 2004/0001461 A1 | 1/2004 | Lohtia et al. |
| 2004/0037237 A1 | 2/2004 | Lalwaney |
| 2004/0095906 A1 | 5/2004 | Rajkotia |

(Continued)

FOREIGN PATENT DOCUMENTS

JP    2004503967 A    2/2004

(Continued)

OTHER PUBLICATIONS

Korean Examiner, "KIPO's Notice of Final Rejection," Korean Intellectual Property Office, Daejeon, Republic of Korea, May 26, 2010, 5 pages, most relevant pp. 1-2.

(Continued)

*Primary Examiner* — Chi H. Pham
*Assistant Examiner* — Shick Hom
(74) *Attorney, Agent, or Firm* — Kenneth Haas; Jeffrey K. Jacobs

(57) ABSTRACT

Various embodiments are described to provide more efficient interworking in inter-technology networks. A first network node (121) provides access network service to remote units (101, e.g.) using a first access network technology, while a second network node provides access network service to remote units using a second and different access network technology. The first network node indicates to a networking device (122), what messaging associated with the second access network technology will be supported by a remote unit via the first network node. The networking device receiving this indication can then determine whether new messaging for the remote unit associated with the second access network technology and to be conveyed via the first network node, is supported. This networking device can then prevent the conveyance of the new messaging via the first network node.

8 Claims, 7 Drawing Sheets

U.S. PATENT DOCUMENTS

| | | | |
|---|---|---|---|
| 2004/0120283 A1 | 6/2004 | Rezaiifar et al. | |
| 2005/0174939 A1 | 8/2005 | Willey et al. | |
| 2005/0226154 A1 | 10/2005 | Julka et al. | |
| 2005/0243870 A1 | 11/2005 | Balogh et al. | |
| 2005/0276273 A1 | 12/2005 | Oprescu-Surcobe et al. | 370/401 |
| 2006/0072506 A1 | 4/2006 | Sayeedi | |
| 2006/0109818 A1 | 5/2006 | Ramanna | |
| 2006/0148511 A1 | 7/2006 | Bender et al. | 455/550.01 |
| 2006/0245394 A1 | 11/2006 | Baba | |
| 2006/0251058 A1 | 11/2006 | Xu et al. | 370/352 |
| 2006/0276189 A1* | 12/2006 | Kiernan et al. | 455/436 |
| 2007/0274217 A1* | 11/2007 | Long et al. | 370/235 |
| 2008/0096560 A1* | 4/2008 | Felske et al. | 455/436 |
| 2008/0298313 A1* | 12/2008 | Salminen | 370/329 |
| 2010/0061337 A1* | 3/2010 | Hallenstal et al. | 370/331 |

FOREIGN PATENT DOCUMENTS

| | | |
|---|---|---|
| JP | 2006512867 A | 4/2006 |
| KR | 1020010089014 A | 9/2001 |
| WO | 0197545 A3 | 12/2001 |
| WO | 2004057815 A3 | 7/2004 |
| WO | 2005022939 A1 | 3/2005 |
| WO | 2005125110 A2 | 12/2005 |
| WO | 2006085218 A1 | 8/2006 |
| WO | 2006107701 A2 | 10/2006 |
| WO | 2006110158 A2 | 10/2006 |

OTHER PUBLICATIONS

English translation of China Office Action for counterpart Application No. 200780042079.2 issued on Jan. 31, 2012.
European Search Report for counterpart European Application No. 07 86 8457, European Patent Office, The Hague, Netherlands, mailed on Feb. 16, 2012.
Final Office Action mailed Sep. 19, 2008 in related U.S. Appl. No. 11/141,926, Valentin Oprescu-Surcobe, filed Jun. 1, 2005.
International Preliminary Report on Patentability related International Application No. PCT/US2005/20298 issued on Dec. 14, 2006.
International Search Report and Written Opinion for related International Application No. PCT/US2005/20298 mailed on Jun. 7, 2006.
Korea Office Action for related Application No. 10-2006-7025932 issued on Jan. 25, 2008.
Non Final Office Action mailed Dec. 26, 2007 in related U.S. Appl. No. 11/141,926, Valentin Oprescu-Surcobe, filed Jun. 1, 2005.
Vriendt, J., et al., "Mobile Network Evolution: A Revolution on the Move," Broadband Access Series, IEEE Communications Magazine, vol. 40, No. 4, Apr. 1, 2002 pp. 104-111.
International Search Report & Written opinion for International Application No. PCT/US2007/81518 mailed on Apr. 29, 2008.
English Translation of Office action dated Aug. 30, 2011 for Japanese Patent Application No. 2009535386.
English Translation of KIPO'S Notice of Preliminary Rejection dated Sep. 29, 2009 for Korean Patent Application No. 1020070115006.

* cited by examiner

- PRIOR ART -

- PRIOR ART -

- PRIOR ART -

METHOD AND APPARATUS FOR INTERWORKING IN AN INTER-TECHNOLOGY NETWORK

REFERENCE(S) TO RELATED APPLICATION(S)

The present application claims priority from a provisional application, Ser. No. 60/865,538, entitled "METHOD AND APPARATUS FOR INTERWORKING IN AN INTER-TECHNOLOGY NETWORK," filed Nov. 13, 2006, which is commonly owned and incorporated herein by reference in its entirety.

This application is related to abandoned application, Ser. No. 11/141,926, entitled "METHOD AND APPARATUS TO FACILITATE INTER-OPERABILITY BETWEEN A 3G1X NETWORK AND A WIRELESS PACKET DATA NETWORK," filed Jun. 1, 2005, which is assigned to the assignee of the present application.

FIELD OF THE INVENTION

The present invention relates generally to communication systems and, in particular, to interworking in inter-technology networks.

BACKGROUND OF THE INVENTION

Operators are beginning to roll out circuit-packet, inter-technology networks where a circuit RAN (Radio Access Network) delivers circuit services support and a packet data RAN delivers packet data services support to a user via 'dual mode' mobile station device or a hybrid mobile capable of communicating with both a circuit RAN and a packet data RAN via two access network technologies.

Circuit services support typically includes traditional circuit voice service, Short Message Service (SMS), etc., while packet data services include support for internet applications such as VoIP (Voice over IP), Video Telephony, Instant Messaging, email, etc.

A circuit RAN may include for example a cdma2000 1x RAN as specified by the 3GPP2 A.S00011-A.S00017 Revision C standard specifications. A packet data RAN may include for example an HRPD (High Rate Packet Data) RAN as specified by the 3GPP2 A.S0008-A, A.S0009-A standards specification, and/or some other IEEE 802.x-based packet data network (802.16, e.g.).

FIG. 1 is a block diagram depiction of a wireless communication system 100 in accordance with the prior art. FIG. 1 depicts a circuit-packet, inter-technology network in which the circuit RAN provides circuit voice services support and a packet data RAN such as an HRPD, WiMAX, or other IEEE 802.x-based packet data network provides packet data services to a user of a dual technology mobile. It is assumed here that the circuit network does not support packet data services. Alternatively, the inter-technology network may include two packet data RANs.

FIGS. 2 and 3 are respective block diagram depictions of 3GPP2 A.S0008-B and A.S0009-B inter-technology networks 200 and 300 in which the circuit RAN provides circuit voice service support and the HRPD RAN provides packet data services to a user of a dual mode mobile device. The IWS (Interworking Solution) Function, as specified in A.S0008-B, for example, may be collocated at either the 1x BS or at the HRPD AN, or may exist as a standalone entity. When the IWS function is collocated at the 1x BS, an A21 interface terminates at the 1x BS and the HRPD AN. When the IWS function is collocated at the HRPD AN, an A1/A1p interface is supported by the HRPD RAN and terminates at the MSC and the HRPD AN, and the A21 interface is internal to the HRPD AN. When the IWS exists as a standalone entity, an A1/A1P interface terminates at the MSC and the IWS, and the A21 interface terminates at the IWS and the HRPD AN.

In these types of circuit-packet, inter-technology networks, a dual mode mobile device may be 'cross-paged' by the corresponding inter-connected serving RAN, since dual mode mobiles may only be able to monitor incoming signaling from a single air interface at a time. Messages between the circuit RAN and the packet data RAN associated with a mobile device are exchanged over an inter-technology signaling interface (e.g., an A21 connection). For example, air interface messages originating from the circuit RAN are sent by a circuit node in the circuit RAN over the inter-technology interface to a packet data node which is providing packet data services to the mobile in the packet data RAN. U.S. patent application Ser. No. 11/141,926, entitled "METHOD AND APPARATUS TO FACILITATE INTER-OPERABILITY BETWEEN A 3G1X NETWORK AND A WIRELESS PACKET DATA NETWORK," may be referenced for examples of how a packet RAN may be notified of an incoming circuit voice call from a 1x circuit network. Messages associated with a mobile device operating in the circuit services RAN may also originate in the HRPD RAN and be sent over the inter-technology interface for delivery to the mobile via the circuit services RAN.

Architectures, such as those depicted in FIGS. 2 and 3, may be used to support cross-paging services. For example, when the IWS function is integrated into a 1x BS, or exists as a standalone entity, it receives IOS 1x messages from the MSC via the IOS A1 interface and generates 1x air interface signaling for the mobile which is tunneled over to the HRPD RAN via the A21 interface where the HRPD packet data node (AN/PCF) delivers the 1x message to the hybrid mobile via the CSNA protocol as specified in the 3GPP2-C.S0024-A standard specification.

For example, when the MSC requests the 1x BS/IWS to page the mobile for 1x circuit voice services, the IWS generates a 1x General Page message as specified in 3GPP2 C.S0005-C, tunnels it over the A21 signaling interface to the HRPD AN/PCF. The HRPD AN/PCF delivers the 1x General Page to the mobile via CSNA after which the mobile stops monitoring the HRPD air interface (AIF) forward link signaling and traffic channels and begins exchanging signaling on 1x AIF with the 1x RAN to complete a circuit voice call.

Another example is when the MSC sends an SMS message to the 1x BS for the mobile. The 1x BS/IWS tunnels the SMS message over to the HRPD AN/PCF which delivers the SMS message to the mobile via CSNA allowing the mobile to receive the SMS services while it continues to receive packet data service from the HRPD RAN and without having to return to the 1x RAN to receive the service.

As part of support for the CSNA protocol, C.S0024-A provides the AllowedReverseLinkMessages and AllowedForwardLinkMessages attributes, which the HRPD RAN and mobile use to negotiate and determine which 1x messages in the forward and reverse direction shall be supported. For example, the HRPD RAN and mobile may agree to support the 1x Data Burst message, but not support the 1x General Page message in the AllowedForwardLinkMessages attribute. This information is maintained at the HRPD AN/PCF.

If the HRPD/AN receives a 1x General Page message for the mobile from the IWS, the HRPD AN/PCF should not send the message to the mobile and send a message back to the IWS rejecting the message. Since the IWS/1x RAN is unaware which messages the mobile has agreed to accept, the IWS may continue to send 1x General Page messages (GPM) to the HRPD AN/PCF every time the MSC requests the 1x BS to page the mobile for a circuit voice. The HRPD AN/PCF will continuously reject the message.

The IWS could make an assumption that GPM may not be supported by the mobile (though the mobile may be rejecting the page due to calling party number), and stop sending GPMs for the mobile. However, this assumption could be incorrect if a mobile rejects pages due to the calling party number information, or it just doesn't want to be disturbed with circuit voice services at the time, but is willing to receive them after completing a packet data service (a Video Telephony call, for example).

Furthermore, the HRPD RAN and the MS may renegotiate the AllowedForwardLinkMessages attribute at any time when the mobile is ready to receive a 1x GPM. In this case the mobile will not receive pages since the IWS incorrectly assumed that the message is not supported and is no longer forwarding GPM messages for the mobile to the HRPD RAN.

FIG. 4 is a signaling flow diagram that depicts present-day signaling example for a situation in which 1x General Page messages (GPMs) are not supported, in accordance with the prior art. A detailed description of the signaling flow timeline as labeled on the rightmost column of FIG. 4 follows:

- 401. The mobile HRPD PD NODE negotiates (or renegotiates) which 1x forward link messages shall be supported via the HRPD CSNA AllowedForwardLinkMessages attribute. In this scenario, GPM messages will not be supported.
- 402. A circuit voice call arrives for the mobile at the 1x RAN. The MSC sends an A1 page message to the IWS (or 1x BS/IWS).
- 403. The IWS sends an A21 1x Air Interface message containing a 1x General Page message to the HRPD PD NODE where the mobile is receiving packet data service.
- 404. The HRPD PD NODE responds with an A21-Ack message rejecting the message since the mobile notified the HRPD PD NODE that 1x GPMs via CSNA should not be sent to it.
- 405. The IWS sends an A1 Rejection message to the mobile to notify the MSC that the mobile rejected the 1x circuit voice call.
- 406. Another circuit voice call arrives for the mobile at the 1x RAN. The MSC sends an A1 page message to the IWS (or 1x BS/IWS).
- 407. The IWS sends another A21 1x Air Interface message containing a 1x General Page message to the HRPD PD NODE where the mobile is receiving packet data service.
- 408. The HRPD NODE responds with an A21-Ack message rejecting the message since the mobile notified the HRPD PD NODE that it should not be sent 1x GPMs via CSNA.
- 409. The IWS sends an A1 Rejection message to the mobile to notify the MSC that the mobile rejected the 1x circuit voice call.

This process may continue repeating and result in excessive signaling resource wastage over the A21 interface. Thus, it would be desirable to have a method and apparatus that could provide better interworking in an inter-technology network to avoid certain signaling inefficiencies.

Specific embodiments of the present invention are disclosed below with reference to FIGS. 5-7. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the signaling flow diagrams above are described and shown with reference to specific signaling exchanged in a specific order, some of the signaling may be omitted or some of the signaling may be combined, sub-divided, or reordered without departing from the scope of the claims. Thus, unless specifically indicated, the order and grouping of the signaling depicted is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Various embodiments are described to provide more efficient interworking in inter-technology networks. A first network node provides access network service to remote units using a first access network technology, while a second network node provides access network service to remote units using a second and different access network technology. The first network node indicates to a networking device, what messaging associated with the second access network technology will be supported by a remote unit via the first network node. The networking device receiving this indication can then determine whether new messaging for the remote unit associated with the second access network technology and to be conveyed via the first network node, is supported. This networking device can then prevent the conveyance of the new messaging via the first network node.

Figure 5:
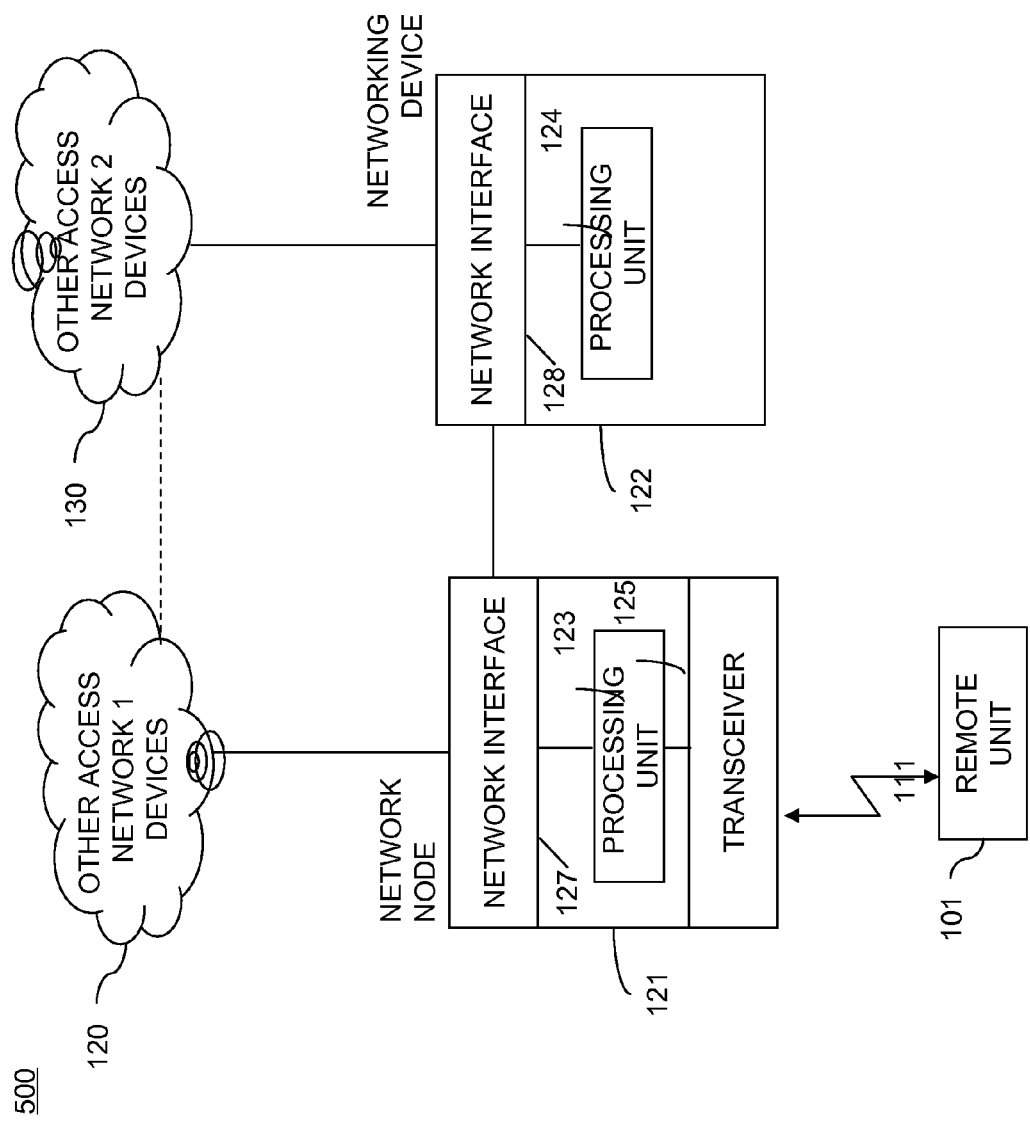
FIG. 5 is a block diagram depiction of a wireless communication system in accordance with multiple embodiments of the present invention.
Figure 6:
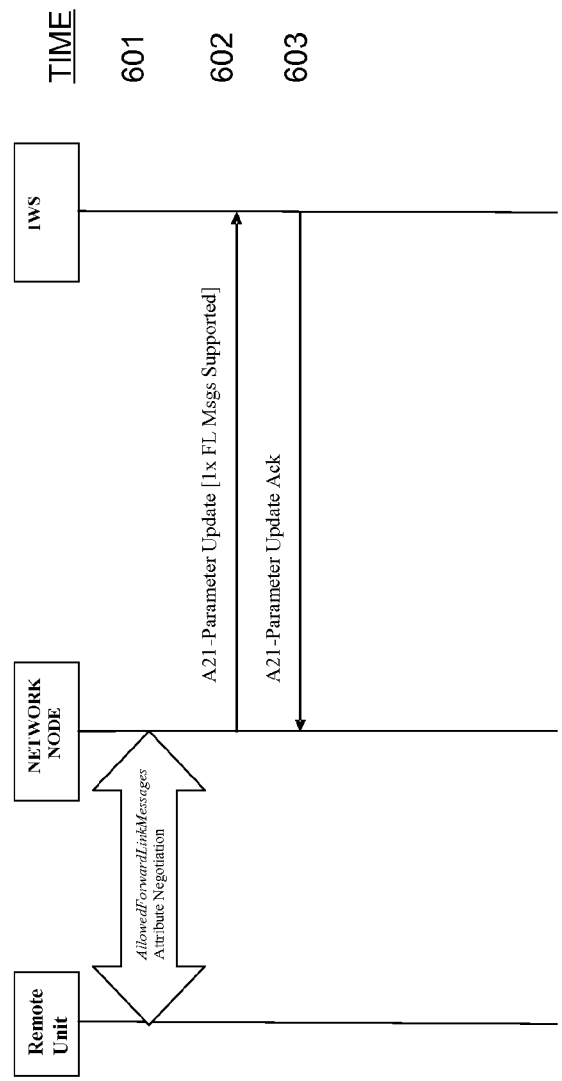
FIG. 6 is a signaling flow diagram that depicts an example of new signaling to indicate what messaging will be supported by a remote unit, in accordance with multiple embodiments of the present invention.
Figure 7:
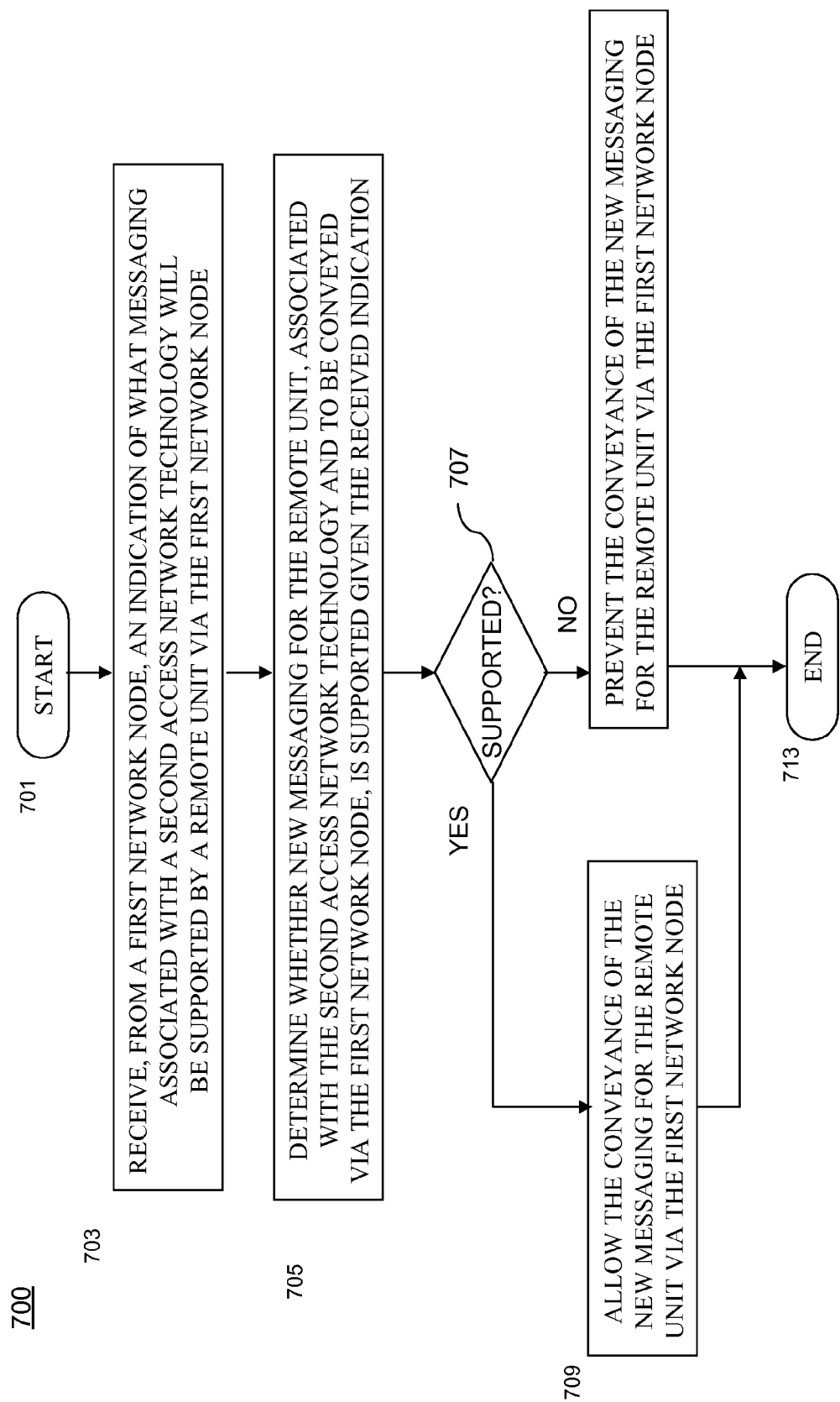
FIG. 7 is a logic flow diagram of functionality performed by a networking device in accordance with multiple embodiments of the present invention.

The disclosed embodiments can be more fully understood with reference to FIGS. 5-7. FIG. 5 is a block diagram depiction of a wireless communication system 500 in accordance with multiple embodiments of the present invention. At present, standards bodies such as OMA (Open Mobile Alliance), 3GPP (3rd Generation Partnership Project), 3GPP2 (3rd Generation Partnership Project 2), IEEE (Institute of Electrical and Electronics Engineers) 802, and WiMAX Forum are developing standards specifications for wireless telecommunications systems. (These groups may be contacted via http://www.openmobilealliance.com, http://www.3gpp.org/, http://www.3gpp2.com/, http://www.ieee802.org/, and http://www.wimaxforum.org/ respectively.) Communication system 500 represents a system having an architecture in accordance with one or more of the 3GPP2 and/or IEEE 802 technologies, suitably modified to implement the present invention. For example, access network 1 (represented by devices 120 and 121) may have an architecture based on a technology such as CDMA2000 1x, HRPD (High Rate Packet Data), WiMAX (Worldwide Interoperability for Microwave Access), or an IEEE 802.x-based technology, while access network 2 (represented by devices 122 and 130) may have an architecture based on a different technology from this list. Clearly, many technology combinations are possible, just by selecting from the list above. In addition, alternative embodiments of the present invention may be implemented in communication systems that employ other or additional technologies such as, but not limited to, those described in the 3GPP specification.

Communication system 500 is depicted in a very generalized manner. In particular, network node 121 is shown respectively communicating via wireless interface 111 with remote unit 101, this interface being in accordance with the particular access technology supported by access network 1. (Note that "access technology" and "access network technology" are used herein to refer to one or more technologies supported/utilized by a network in providing access; an air interface signaling technology is therefore one example of an access network technology.) Similarly, devices such as networking device 122 (and/or one or more of devices 130, depending on the embodiment) communicate with remote units such as remote unit 101 via the particular access technology supported by access network 2 (although this is not depicted as such in FIG. 3). Those skilled in the art will recognize that FIG. 3 does not depict all of the physical fixed network components that may be necessary for system 500 to operate but only those system components and logical entities particularly relevant to the description of embodiments herein.

Figure 1:
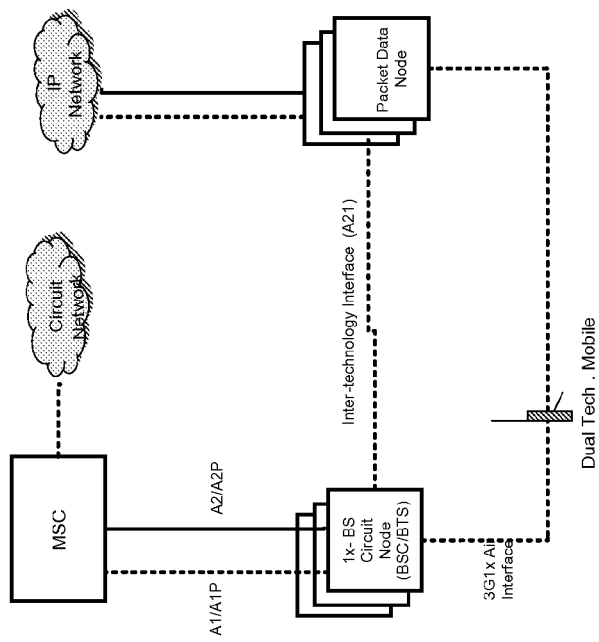
FIG. 1 is a block diagram depiction of a wireless communication system in accordance with the prior art.
Figure 2:
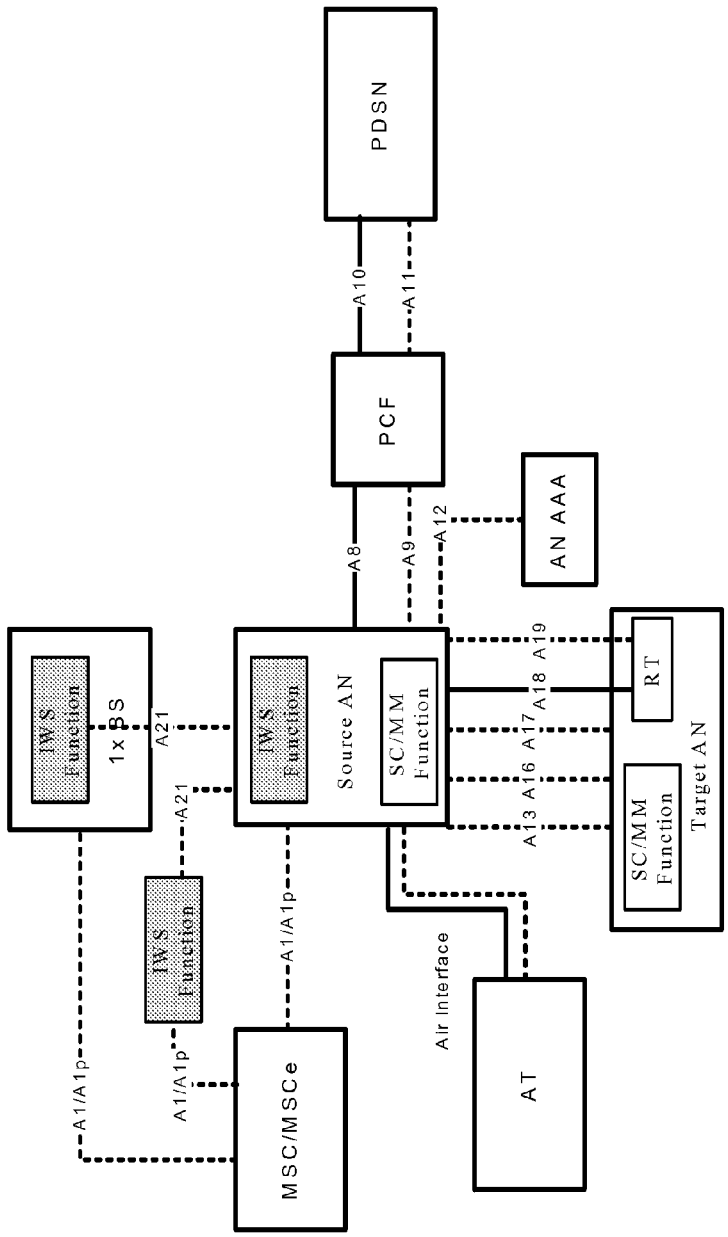
FIG. 2 is a block diagram depiction of 3GPP2 A.S0008-B inter-technology network in which a circuit RAN provides circuit voice service support and an HRPD RAN provides packet data services in accordance with the prior art.
Figure 3:
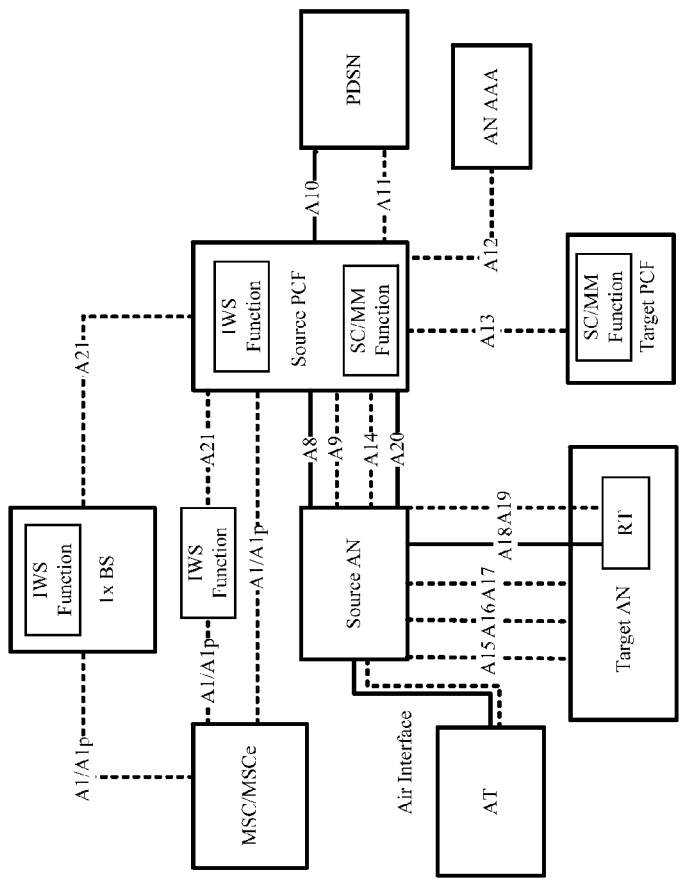
FIG. 3 is a block diagram depiction of 3GPP2 A.S0009-B inter-technology network in which a circuit RAN provides circuit voice service support and an HRPD RAN provides packet data services in accordance with the prior art.
Figure 4:
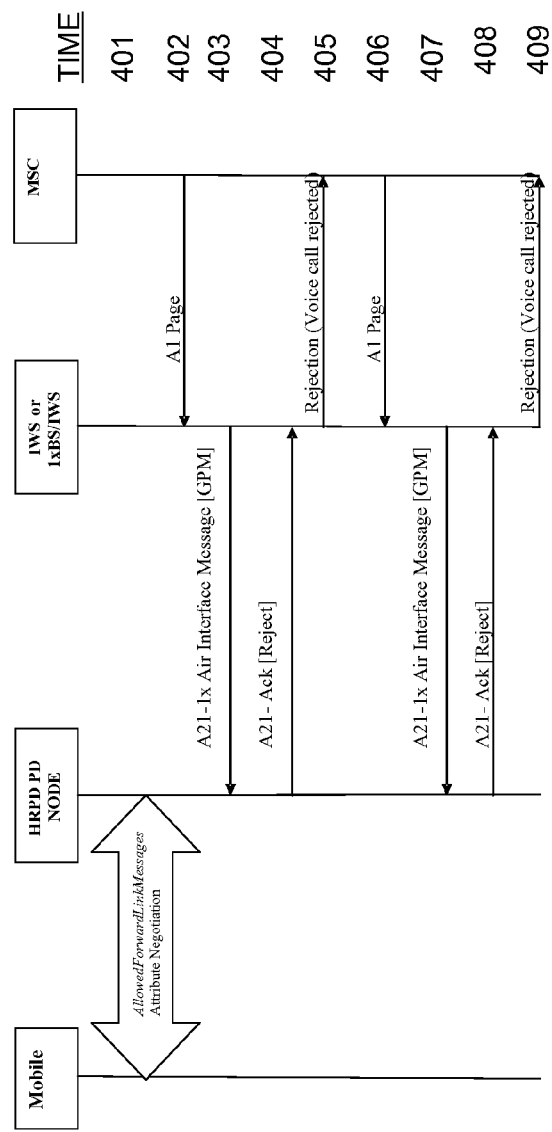
FIG. 4 is an exemplary signaling flow diagram that depicts present-day signaling for a situation in which 1x General Page messages (GPM) are not supported, in accordance with the prior art.

For example, FIG. 3 depicts network node 121 as comprising processing unit 123, transceiver 125 and network interface 127 and networking device 122 as comprising processing unit 124 and network interface 128. In general, components such as processing units, transceivers and network interfaces are well-known. For example, processing units are known to comprise basic components such as, but neither limited to nor necessarily requiring, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using signaling flow diagrams, and/or expressed using logic flow diagrams.

Thus, given a high-level description, an algorithm, a logic flow, a messaging/signaling flow, and/or a protocol specification, those skilled in the art are aware of the many design and development techniques available to implement a processing unit that performs the given logic. Therefore, devices 121 and 122 represent known devices that have been adapted, in accordance with the description herein, to implement multiple embodiments of the present invention. Furthermore, those skilled in the art will recognize that aspects of the present invention may be implemented in and across various physical components and none are necessarily limited to single platform implementations. For example, a network node may be implemented in or across one or more RAN components, such as a base transceiver station (BTS) and/or a base station controller (BSC) or an HRPD AN and/or PCF, or implemented in or across one or more access network (AN) components, such as an access service network (ASN) gateway and/or ASN base station (BS), an access point (AP), a wideband base station (WBS), and/or a WLAN (wireless local area network) station. Also, networking device 122 may be implemented in or across one or more network components, such as a base station (BS), a mobile switching center (MSC), and/or a standalone server.

Remote unit 101 and network node 121 is shown communicating via a technology-dependent, wireless interface. Remote units, subscriber stations (SSs) or user equipment (UEs), may be thought of as mobile stations (MSs); however, remote units are not necessarily mobile nor able to move. In addition, remote unit platforms are known to refer to a wide variety of consumer electronic platforms such as, but not limited to, mobile stations (MSs), access terminals (ATs), terminal equipment, mobile devices, gaming devices, personal computers, and personal digital assistants (PDAs). In particular, remote unit 101 comprises a processing unit (not shown) and transceiver (not shown). Depending on the embodiment, remote unit 101 may additionally comprise a keypad (not shown), a speaker (not shown), a microphone (not shown), and a display (not shown). Processing units, transceivers, keypads, speakers, microphones, and displays as used in remote units are all well-known in the art.

Operation of embodiments in accordance with the present invention occurs substantially as follows, first with reference to FIG. 5. Access network 1 provides access network service to remote units using a first access network technology, while access network 2 provides access network service to remote units using and a second, and different, access network technology. Network node processing unit 123 establishes what messaging associated with the second access network technology will be supported by remote unit 101 via network node 121.

Depending on the embodiment, processing unit 123 may do this in several ways. For example, access network 1 may have a policy regarding what features/signaling should be supported by remote unit 101 while it is receiving services from it, and/or access network 1 may have stored, based on earlier communication, what air interface messaging associated with the second access network technology remote unit 101 supports. In some embodiments, processing unit 123 may perform signaling with remote unit 101, via transceiver 125, to establish what air interface messaging associated with the second access network technology will be supported by remote unit 101. This signaling may take the form of a negotiation between processing unit 123 and remote unit 101 to determine which messaging, if any, will be supported or configuration.

Having determined what messaging associated with the second access network technology will be supported by remote unit 101 via network node 121, processing unit 123 indicates its determination to networking device 122 via network interface 127. As described above, networking device 122 may take the form of various devices depending on the embodiment. For example, networking device 122 may represent part of a network node similar to node 121, for example, or networking device 122 may possibly represent part of an access network 2 MSC. Networking device 122 may also represent an intermediary device that interworks between network node 121 and a network node or an MSC in access network 2 (depicted as one of the other access network 2 devices 130). An example, of such an intermediary device would be a standalone IWS.

The indication of what messaging will be supported by remote unit 101 may take various forms depending on the embodiment. Examples include, but are not limited to, signaling that indicates whether all messaging associated with the second access network technology will be supported, whether all messaging associated with the second access network technology will not be supported, which messaging associated with the second access network technology will be supported by the remote unit, and/or which messaging associated with the second access network technology will not be supported by the remote unit.

Furthermore, in some embodiments the indication may be sent via an A21 interface between network node 121 and networking device 122. For example, in the case of access network 1 representing an HRPD access network and access network 2 representing a 1x access network, the HRPD access network may send to the 1x access network via an A21 interface, a message indicating whether transmission of 1x air interface signaling messages to an access terminal by the HRPD access network is disabled, whether transmission of 1x air interface signaling messages to an access terminal by the HRPD access network is enabled, which 1x air interface signaling messages may be transmitted to the access terminal by the HRPD access network, and/or (depending on the embodiment) which 1x air interface signaling messages may be transmitted to the access terminal by the HRPD access network.

FIG. 6 is a signaling flow diagram 600 that depicts a detailed example of new signaling to indicate what messaging will be supported by a remote unit, in accordance with multiple, yet quite specific, embodiments of the present invention. Although specific to HRPD/1x embodiments that utilize CSNA signaling, the embodiments depicted by diagram 600 include embodiments in which an IWS function is co-located at the 1x BS or operates as a standalone IWS as described previously. It is also applicable to HRPD CSNA support, and also to HRPD-to-1x hard handoff support.

When an HRPD RAN and a mobile negotiate which 1x forward link (FL) messages shall be supported by the mobile via the AllowedForwardLinkMessages attribute, the HRPD RAN forwards the attribute information to the IWS. The IWS stores this information along with the mobile identifier and its A21/HRPD AN-PCF mapping information. When the co-located 1x BS/IWS or standalone IWS receives a message from the MSC requiring a forward link air interface message to be generated and sent to the mobile, the IWS first determines whether the mobile has agreed to receive this message via CSNA. If not, the IWS shall not send this message over the A21 interface to the HRPD AN/PCF. Given the expected signaling traffic over the A21 interface to support CSNA and HRPD-1x handoffs, this will substantially reduce signaling traffic over A21, reduce processing overhead at the HRPD AN/PCF, and thereby improve the efficiency of cross-technology services.

The following is a detailed description of the call flow timeline as labeled on the rightmost column of FIG. 6:

601. The mobile and network node (HRPD RAN PD NODE) negotiate (or renegotiate) which 1x forward link messages shall be supported via the HRPD AllowedForwardLinkMessages attribute. Alternatively, the HRPD PD NODE and mobile enable or disable the CSNA protocol.
602. The HRPD RAN PD NODE sends a message to the IWS (either 1x BS/IWS or standalone IWS) via the inter-RAN A21 interface containing a CSNA event to notify the IWS which 1x forward link messages can be sent to the mobile via CSNA. The message contains an indication of which 1x FL messages are supported via CSNA. If the CSNA protocol is disabled, this is also indicated to the IWS. The HRPD RAN starts a timer.
603. The IWS updates this information for the mobile. The IWS responds with an acknowledgement message to the network node. In response, the HRPD RAN PD NODE cancels the timer. Any subsequent messages, received at the IWS from the MSC for the mobile which require 1x air interface FL message to be sent to the mobile, are first checked against this list. If the FL air interface (AIF) message is not to be sent to the mobile via CSNA, the IWS shall not send the message to the HRPD RAN PD NODE. If the CSNA protocol is disabled or not supported by the mobile, no 1x air interface messages are sent over A21 to the HRPD PD NODE for the mobile. In the case of an unsupported message, the IWS may initiate a failure procedure with the MSC. Optionally, the IWS may pass information regarding which messages are supported to the MSC to thereby reduce traffic over the A1/A1P signaling link.

One of skill in the art will appreciate that various modifications and changes may be made to the specific embodiments described above with respect to FIG. 6 without departing from the spirit and scope of the present invention. Thus, the discussion of certain embodiments in greater detail above is to be regarded as illustrative and exemplary rather than restrictive or all-encompassing, and all such modifications to the specific embodiments described above are intended to be included within the scope of the present invention.

A description of embodiments with reference to FIG. 5 will now resume. Networking device processing unit 124 receives, from network node 121 via network interface 128, the indication of what messaging associated with the second access network technology will be supported by remote unit 101 via the first network node 121. In some embodiments, processing unit 124 sends messaging in acknowledgment of the received indication to network node 121 via network interface 128. With knowledge of what messaging will be supported by remote unit 101, processing unit 124 determines whether new messaging for remote unit 101, associated with the second access network technology and to be conveyed via network node 121, will be supported.

Depending on the embodiment, the new messaging for remote unit 101 may be received from another networking device or may be messaging that is triggered by signaling which is received from another networking device. For example, processing unit 124 may receive A1 messaging from an MSC (one of devices 130) that would trigger the generation of messaging associated with the second access network technology which is to be conveyed via network node 121 to remote unit 101. If processing unit 124 determines that the new messaging for the remote unit is not supported, then processing unit 124 prevents the conveyance of the new messaging to network node 121.

Instead of proceeding to convey the new messaging to network node 121, networking device 122 may communicate the messaging failure to the other networking device (one of devices 130). For example, processing unit 124 may indicate via networking interface 128 one or more of the following: that a failure condition is present, that messaging could not be conveyed to the remote unit, and/or that the new messaging is not supported by the remote unit.

By not conveying unsupported messaging to network node 121 (and perhaps, additionally, by handling the messaging failure signaling), networking device 122 reduces the amount of unnecessary signaling between access networks 1 and 2 and also reduces the amount of unnecessary processing that network node 121 needs to perform. Thus, embodiments of the present invention are able to provide more efficient interworking in inter-technology networks.

FIG. 7 is a logic flow diagram that more generally depicts the functionality performed by a networking device in accordance with multiple embodiments of the present invention. Logic flow 700 begins (701) with the networking device receiving (703), from a first network node, an indication of what messaging associated with a second access network technology will be supported by a remote unit via the first network node. Here, the second access network technology is a different access network technology than a first access network technology, which is utilized by the first network node. For new messaging then, the networking device determines (705) whether the new messaging for the remote unit, associated with the second access network technology and to be conveyed via the first network node, is supported, given the received indication. If (707) the new messaging for the remote unit is determined to be supported, the networking device proceeds (709) with conveying the new messaging to the first network node. However, if (707) the new messaging for the remote unit is determined to not be supported, the networking device prevents (711) the conveyance of the new messaging for the remote unit via the first network node. Logic flow 700 thus ends (713).

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, and the like, are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") are intended to encompass all the various techniques available for communicating or referencing the object being indicated. Some, but not all examples of techniques available for communicating or referencing the object being indicated include the conveyance of the object being indicated, the conveyance of an identifier of the object being indicated, the conveyance of information used to generate the object being indicated, the conveyance of some part or portion of the object being indicated, the conveyance of some derivation of the object being indicated, and the conveyance of some symbol representing the object being indicated. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for interworking in an inter-technology network comprising:
    indicating, by a first network node to one of a second network node and an intermediary device that interworks for the first network node, what messaging associated with a second access network technology will be supported by a remote unit via the first network node;
    wherein the first network node provides access network service to the remote unit using a first access network technology, which is a different access network technology than the second access network technology utilized by the second network node;
    performing, by the first network node, signaling with the remote unit to establish what messaging associated with the second access network technology will be supported by the remote unit via the first network node.

2. The method of claim 1, wherein performing signaling with the remote unit to establish what messaging will be supported comprises
    negotiating with the remote unit which messaging, if any, associated with the second access network technology will be supported by the remote unit via the first network node.

3. The method of claim 1, wherein indicating what messaging will be supported by the remote unit via the first network node comprises
    sending a message that indicates at least one of
        whether all messaging associated with the second access network technology will be supported,
        whether all messaging associated with the second access network technology will not be supported,
        which messaging associated with the second access network technology will be supported by the remote unit, and
        which messaging associated with the second access network technology will not be supported by the remote unit.

4. The method of claim 1, wherein indicating what messaging will be supported by the remote unit via the first network node comprises
    sending a message via an A21 interface identifying the messaging that will be supported by the remote unit.

5. The method of claim 1, further comprising
    receiving messaging in acknowledgment of the indication.

6. The method of claim 1,
    wherein the first access network technology comprises one of CDMA2000 1x, CDMA2000 HRPD (High Rate Packet Data), WiMAX (Worldwide Interoperability for Microwave Access), and an IEEE 802.x-based technology, wherein the second access network technology comprises one of CDMA2000 1x, CDMA2000 HRPD, WiMAX, and an IEEE 802.x-based technology.

7. A network node comprising:

a transceiver;

a network interface; and a processing unit, communicatively coupled to the transceiver and the network interface, adapted to indicate, via the network interface to one of a second network node and an intermediary device that interworks for the network node, what messaging associated with a second access network technology will be supported by a remote unit via the network node, wherein the network node provides access network service to the remote unit using a first access network technology, which is a different access network technology than the second access network technology utilized by the second network node wherein the processing unit is further adapted to perform signaling with the remote unit, via the transceiver, to establish what messaging associated with the second access network technology will be supported by the remote unit via the network node.

8. The network node of claim 7, wherein the intermediary device that interworks for the network node comprises an interworking solution.

* * * * *